United States Patent

[11] 3,632,313

[72] Inventor Arnold W. Kilgren
 Wilmington, Del.
[21] Appl. No. 816,962
[22] Filed Apr. 17, 1969
[45] Patented Jan. 4, 1972
[73] Assignee E. I. du Pont de Nemours and Company
 Wilmington, Del.

[54] METHOD OF HEATING OXYGEN-CONTAINING GASES FOR THE PRODUCTION OF TITANIUM DIOXIDE PIGMENT
 3 Claims, 2 Drawing Figs.

[52] U.S. Cl. .................................................. 23/202,
 23/1, 23/140, 23/142, 23/144, 23/145, 23/182,
 23/200, 23/221, 263/52
[51] Int. Cl. ..................................................... C01g 23/04,
 C01b 13/00
[50] Field of Search ........................................... 23/221, 202
 V, 202, 212, 140, 142, 144, 145, 182, 200;
 252/373

[56] References Cited
 UNITED STATES PATENTS
 3,363,981 1/1968 Butler ........................... 23/202

| 3,403,001 | 9/1968 | Mas et al. ..................... | 23/202 |
| 3,414,379 | 12/1968 | Wigginton et al. ............. | 23/202 |
| 3,416,890 | 12/1968 | Best et al. ..................... | 23/202 X |
| 2,790,838 | 4/1957 | Schrader ....................... | 252/373 X |

FOREIGN PATENTS

| 631,032 | 11/1961 | Canada ........................ | 23/202 |
| 6,716,928 | 6/1968 | Netherlands .................. | 23/202 |

Primary Examiner—Edward Stern
Attorney—Frank R. Ortolani

ABSTRACT: An oxygen-containing gas is heated to a temperature between 1,200° C. and 1,800° C. to be used in oxidizing titanium Chloride to titanium dioxide. The oxygen-containing gas is first preheated by known means above the ignition temperature of a fuel used in a burner apparatus having a fuel nozzle. The oxygen-containing gas is then passed rectilinearly around the nozzle between 350 and 1,000 feet per second thereby preventing flame eddies. The oxygen-containing gas is commingled with fuel distributed by the nozzle in a combustion zone resulting in an elevation of the gas temperature and is then transferred to a reaction zone where the oxidation process takes place.

INVENTOR
ARNOLD W. KILGREN

BY

ATTORNEY

METHOD OF HEATING OXYGEN-CONTAINING GASES FOR THE PRODUCTION OF TITANIUM DIOXIDE PIGMENT

This invention pertains to a method of heating oxygen-containing gases to a temperature sufficient to produce finely divided metal oxides through vapor phase oxidation of metal chlorides. The invention is primarily concerned with heating oxygen to a temperature between 1,200° and 1,800° C. to be employed in a reaction with titanium tetrachloride for the production of pigmentary titanium dioxide; however, heated oxygen-containing gases may also be advantageous for the oxidation of other volatile metal chlorides such as the chlorides of aluminum, chromium, iron, tin, silicon and zirconium.

Several problems are encountered in obtaining oxygen-containing gas temperatures in excess of 900° C. and more particularly above 1,200° C. A practical method of obtaining a bulk temperature of these gases above 900° C. is to subject the gases to an open flame. A disadvantage of this method, particularly in the pigment industry, is that the products of combustion contaminate the oxygen-containing gas rendering it unsuitable for use in producing a high quality product. Therefore, a method which limits these contaminates of combustion to a minimal level is desirable. One such method is to preheat the gases by a heat-exchanging apparatus before exposing them to the open flame to a temperature ranging between the ignition temperature of the fuel being used, usually 900° C. is sufficient, and a temperature limited by the materials of construction of the apparatus, usually 1,200° C. Due to the high temperatures of the gases, 900° to 1,200° C., particular consideration is given to problems of equipment failure. Typical heat-exchanging apparatus include externally heated tubes, pebble heaters, checker brick interchangers and the like.

In obtaining gas temperatures in the range of 1,200° to 1,800° C. the gas may be contacted with the open flame from a burner. Using an oxygen supply at or above the ignition temperature of the fuel prevents flame out and enables a stable flame to be maintained without the use of flame holders. The high temperature of the preheated gases and the very high temperature of the flame have caused failure in the burner. Destruction occurred even when the burner was water cooled. It is, therefore, the object of this invention to provide a method of heating oxygen without destruction of the burner.

Heating an oxygen-containing gas to temperatures in excess of 1,200° C. is accomplished by the method of this invention. An oxygen-containing gas is preheated by conventional heat exchange means to at least the ignition temperature of a fuel used in a burner apparatus. The burner apparatus is designed in order that fuel is jetted from a cylindrical nozzle having a tip and preheated oxygen is passed rectilinearly around the tip at a velocity sufficient to prevent flame eddies from forming adjacent to the burner. More quantitatively, the gas velocity along the fuel nozzle should be greater than the back diffusion velocity of yet unburned fuel. Preferably, the velocity should be sufficient to sweep any flame eddies, derived from the violent turbulence in the flame, away from the tip of the nozzle and to prevent standing eddies from occurring adjacent to the burner. In practice the minimum velocity is about 350 feet per second. Velocities of up to 1,000 feet per second are practical for operation in this invention.

The preheated gas is commingled with a heating fuel distributed into a combustion zone whereupon spontaneous ignition occurs. Preferably the combustion zone is large enough to prevent contact of the flame with the walls.

The ratio of oxygen to fuel on a mole bases is controlled to obtain the necessary gas velocity and to provide a heat balance giving the desired bulk temperature of the gases leaving the burner apparatus. Final oxygen-containing gas temperatures ranging from 1,200° to 1,800° C. have been found particularly advantageous for subsequent use for oxidizing volatile metal chlorides. Preferably less than 10 percent by weight of a pure oxygen gas is consumed by the fuel. For more dilute oxygen, e.g., air, the desired temperatures are attained by consuming less than 25 percent by weight of the oxygen.

Figure 1:
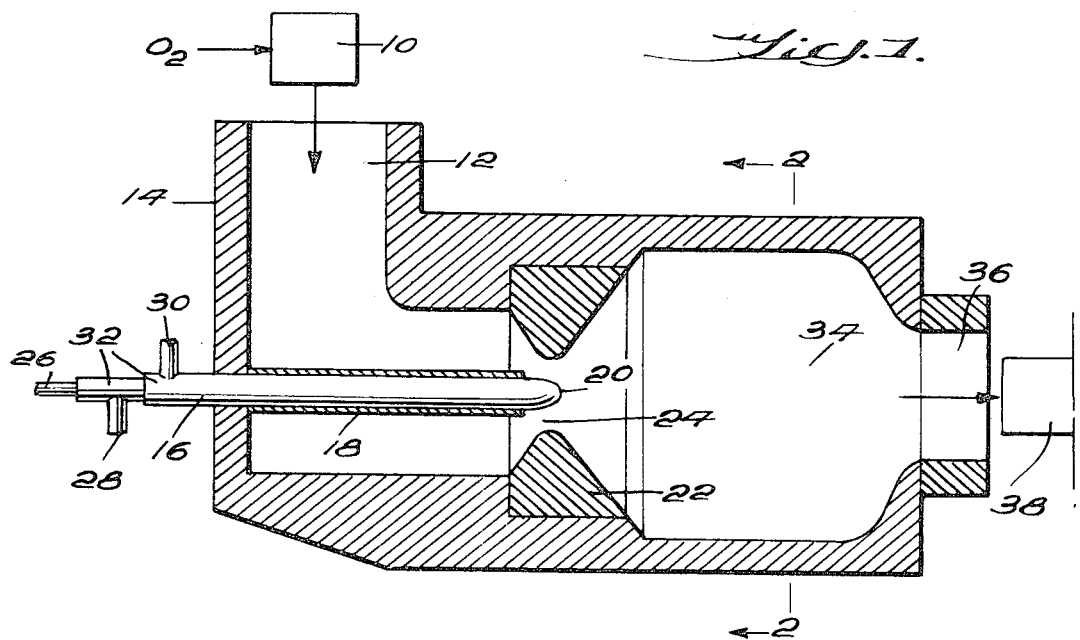
FIG. 1 is a schematic vertical cross-sectional view of one type of apparatus contemplated for use with this invention.
Figure 2:
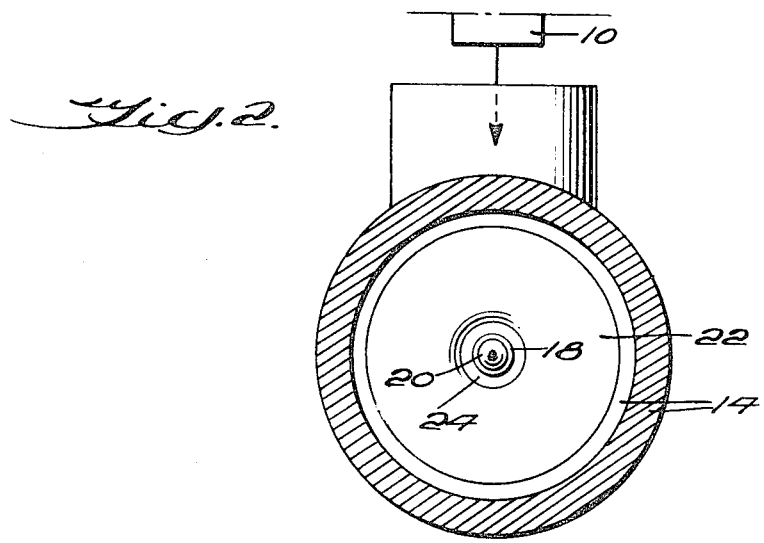
FIG. 2 is a cross-sectional view of the apparatus in FIG. 1 along line 2—2.

An oxygen-containing gas is preheated by a heat exchanger means 10. The preheated gas enters the apparatus at entry port 12. Ceramic lining 14 is provided on the walls of the apparatus to enable it to withstand high temperatures. The gas is then forced through an annular port 24 formed between a restricting device 22 and a tip 20 of a cylindrical nozzle 16. The cylindrical nozzle 16 has an insulating sleeve 18 to prevent undue cooling of the incoming preheated gas. Heating fuel is supplied to the nozzle tip through fuel supply pipe 26. The fuel supply pipe is cooled by a water jacket 32 wherein cooling water enters in entry pipe 28 and exits through exit pipe 30. Other cooling mediums such as oil with a low vapor tension may also be used. The fuel is distributed by the nozzle tip 20. The gas passing through the annular port is commingled with the fuel in a combustion zone 34. The nozzle tip and the restricting device are tapered to give a streamlined flow through the annular port enabling high velocity passage of the gas with minimal friction. After the combustion, the heated gases pass through exit duct 36 to a subsequent reaction zone 38.

The composition of the oxygen-containing gas may range from low concentrations of oxygen such as air and air enriched with oxygen to pure oxygen. Other ancillary substances may be present which are beneficial in reactions where heated oxygen is used. For example, water vapor, alkali and alkaline earth metals in the oxygen-containing gas produce better quality titanium dioxide pigments.

The oxygen-containing gas is preheated to a minimum of the ignition temperature of the particular fuel being used for heating. It is preferred that a higher temperature be maintained, e.g., 900° to 1,200° C., so that fuel byproducts from combustion are minimal.

An essential step of this process is passing the preheated oxygen-containing gas rectilinearly around the nozzle tip at a velocity sufficient to prevent flame eddies from occurring adjacent to the burner. The minimum velocity to prevent these flame eddies is about 350 feet per second. This velocity can be produced by either increasing the flow through the annular port surrounding the fuel tip or by restricting the area of the annular port in order than a greater velocity per volume input is achieved. The restriction should be constructed with heat-resistant materials. Typical methods of restricting the flow are converging ducts, orifices such as knife edged circular orifices, sudden contraction ducts, and a straight duct of the correct diameter. Preferably, a method which creates a low pressure drop should be utilized. Restrictions which follow the contour of the nozzle tip appear to provide better reduction of the flame eddies since it insures that the turbulent flow of the oxygen-containing gases will be in a general forward movement. Velocities up to 1,000 feet per second are practical in this invention.

Fuel for this process may be any gas, liquid or pulverized solid capable of reacting spontaneously with the preheated oxygen-containing gases. Carbon monoxide, hydrogen, hydrocarbon gases, benzene, toluene, liquid hydrocarbons, powdered carbon, coke, and coal are examples of fuel operable in this invention. Low ash fuels are preferable where the heated oxygen is to be used in producing titanium dioxide pigment.

Since the oxygen-containing gases are preheated to at least the ignition temperature of the fuel, ignition devices are unnecessary. The flames produced by the combustion usually reach levels in excess of the operating temperatures of most refractories, therefore, it is preferable to construct a combustion zone large enough to prevent the flames from coming in contact with the walls. When only a minor portion of the oxygen-containing gas is consumed in the combustion a heat balance is created and the gases can be maintained at the desired level. Normally, less than 10 percent of pure oxygen is consumed by the fuel to obtain the desired temperatures between 1,200° and 1,800° C. For air, less than about 25 percent of the oxygen is consumed to obtain these temperatures.

The heated oxygen-containing gas can be transferred to a reaction zone for oxidation of volatile metal chlorides of metals such as titanium, zirconium, silicon, aluminum, tin and iron.

The following examples are illustrations of the methods of this invention and are not limitations thereof. Parts and percentages are by weight unless otherwise specified.

EXAMPLE I

This example illustrates the application of this invention to the heating of oxygen for subsequent reaction with titanium tetrachloride and production of pigmentary titanium dioxide. The apparatus is similar to that in FIG. 1 having an entry port of 8 inches diameter and an annular port of 4 inches outside diameter and 1 inch inside diameter. Immediately downstream from the restricting device the combustion zone flares rapidly to a 24-inch diameter cylindrical space 4 feet long which reduces to a 10-inch exit duct suitable for passage of the high temperature oxygen to a subsequent reaction zone such as described in U.S. Pat. No. 2,791,490. In the test, preheated 99 percent oxygen is supplied to the entry port at 1,100° C. from a pebble heater at 7,200 pounds per hour. The calculated linear velocity of the gas in the annular port is 796 feet per second. The fuel supply line is equipped with a concentric pipe in order that the fuel be atomized upon entry to the combustion zone. Thus, toluene, fuel, supplied at 124 pounds per hour, is atomized with 3 s.c.f.m. of nitrogen. Water is circulated through the water jacket at a rate sufficient to maintain the bulk temperature of the fuel below 100° C. To start the process the preheated oxygen is passed through the burner apparatus until it is near the operating temperature and the oxygen passing the throat is at least at the ignition temperature for toluene. The toluene spray is started and immediate combustion follows raising the outlet temperature to about 1,600° C. Oxygen at 1,600° C. is produced for at least 100 hours without visible damage to the parts due to contact with the flame. About 5.4 percent of the initial oxygen was consumed in the booster burner.

EXAMPLE II

Example I is repeated except the restricting device is lacking thus the consequent gas velocity is about 150 feet per second. The fuel tip was burned out in less than 12 hours.

I claim:

1. In a method for producing titanium dioxide in which (a) a fuel is burned with an oxygen-containing gas provided in an amount in excess of that required to stoichiometrically combine with the fuel to produce an oxygen-containing combustion product having a temperature of 1,200° to 1,800° C., followed by (b) reaction of said combustion product with vaporous titanium tetrachloride; the improvement for producing said combustion product comprising preheating said oxygen-containing gas to a temperature between the ignition temperature of said fuel and 1,200° C., passing a stream of said oxygen-containing gas from a feed zone through a restricted annular port to increase its velocity to between 350 and 1,000 feet per second, and thence to an enlarged combustion zone, jetting said fuel from the tip of a cylindrical-shaped nozzle of a burner rectilinearly into said oxygen-containing gas stream, said tip being positioned adjacent said annular port and the said increased velocity thereby preventing flame eddies from occurring adjacent to the burner.

2. A method according to claim 1 wherein said oxygen-containing gas is oxygen and less than 10 percent by weight thereof is consumed in the combustion.

3. A method according to claim 1 wherein the oxygen-containing gas is air and less than 25 percent by weight of the oxygen therein is consumed in the combustion.

* * * * *